United States Patent [19]
Johansson et al.

[11] 3,742,829
[45] July 3, 1973

[54] MECHANICAL DIFFERENTIAL FOR AN EXPOSURE METER AT PHOTOGRAPHIC CAMERAS

[75] Inventors: Lennart Ragnar Johansson, Landvetter; Lave Tenne, Norrbyvallda, both of Sweden

[73] Assignee: Fritz Victor Hasselblad, Goteborg, Sweden

[22] Filed: Feb. 18, 1972

[21] Appl. No.: 227,534

[30] Foreign Application Priority Data
Apr. 2, 1971 Sweden.................................. 4294

[52] U.S. Cl.............. 95/10 FS, 95/31 FS, 95/64 B
[51] Int. Cl............................................. G03b 17/00
[58] Field of Search............ 95/10 C, 10 FS, 31 FS, 95/64 B

[56] References Cited
UNITED STATES PATENTS

| | | | |
|---|---|---|---|
| 3,491,670 | 1/1970 | Rentschler...................... | 95/31 FS |
| 3,481,259 | 12/1969 | Langnav et al.................. | 95/10 FS |
| 3,601,024 | 8/1971 | Pagel............................... | 95/10 FS |
| 3,500,731 | 3/1970 | Bresson et al.................. | 95/31 FS |

Primary Examiner—Samuel S. Matthews
Assistant Examiner—Russell E. Adams, Jr.
Attorney—Sommers & Young

[57] ABSTRACT

A camera, of the type provided with interchangeable lenses having preset diaphragms and also provided with exchangeable film magazines, includes an exposure meter which incorporates a differential, e.g., of the cable or articulated type. Correction values for two exposure factors are applied as inputs to the differential through the agency of two axially movable rods which sense adjustable stop members which are, in turn, positioned in accordance with said correction values; and the correction value for a third exposure factor is supplied to the exposure meter independently of the differential. The differential is provided with a release device operative to engage the differential to permit automatic exposure measurement when the two adjustable stop members are available for sensing, and operative to disengage the differential when at least one of the adjustable stop members is not available for sensing, thereby to permit the necessary correction factors to be manually set into a control box forming a portion of the mechanism. A signal device, responsive to the position of the release device, indicates whether automatic or manual exposure measurement is to be effected.

17 Claims, 5 Drawing Figures

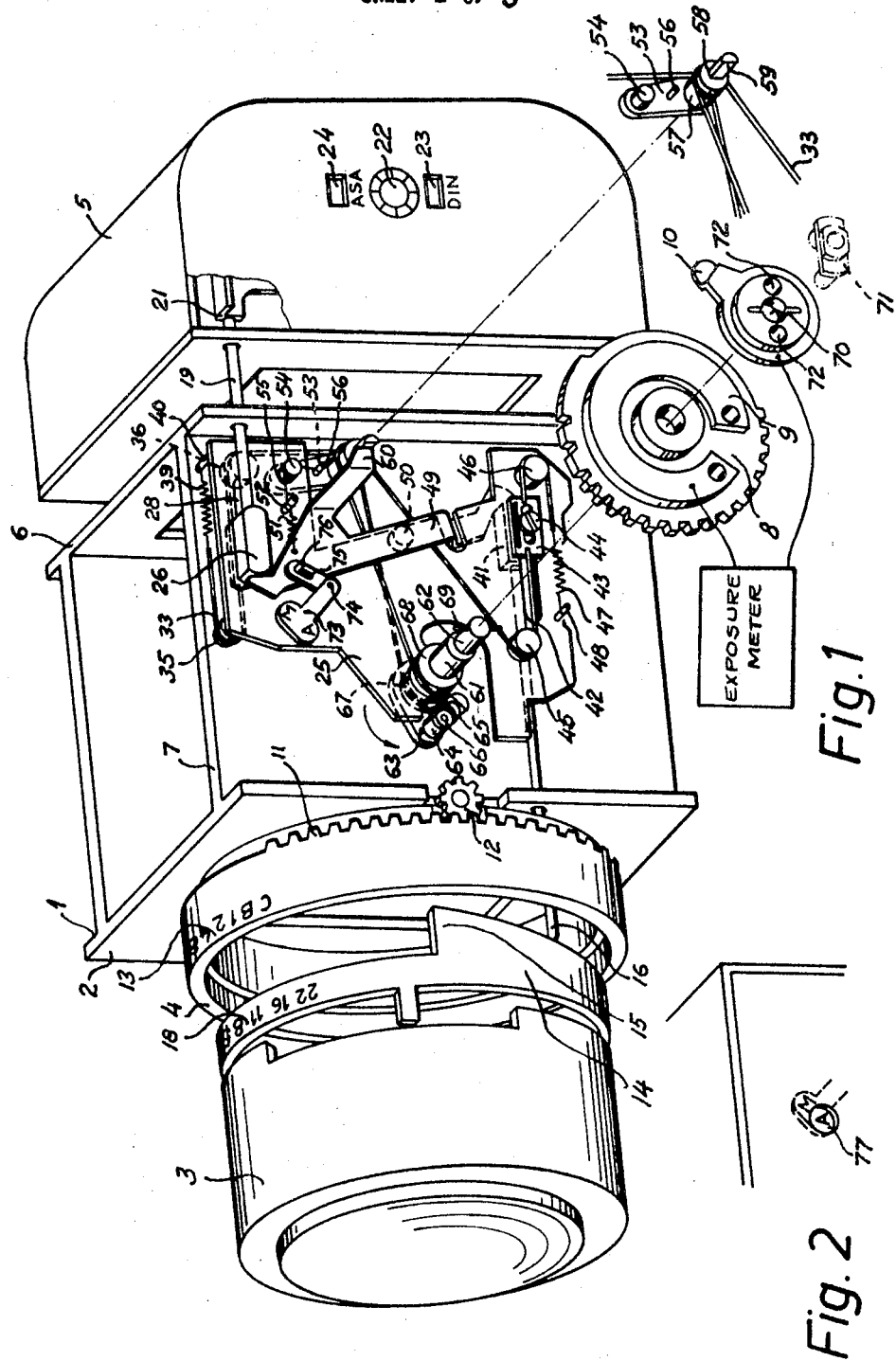

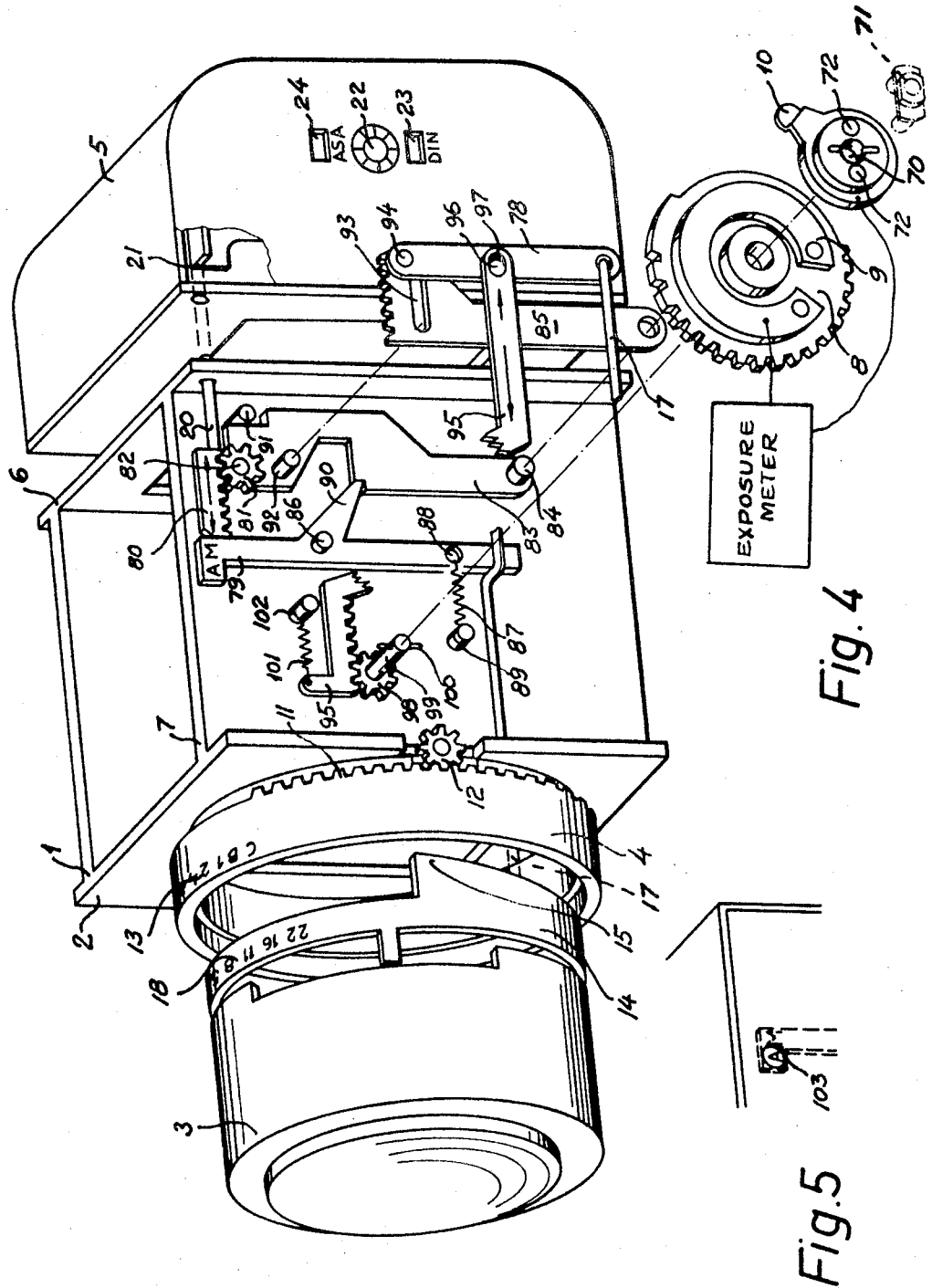

MECHANICAL DIFFERENTIAL FOR AN EXPOSURE METER AT PHOTOGRAPHIC CAMERAS

BACKGROUND OF THE INVENTION

This invention relates to photographic cameras provided with lenses with preset diaphragms, preferably interchangeable lenses, and further provided with exchangeable film magazines and an exposure meter of the through-the-lens type. The invention, more precisely, relates to a mechanical differential which is included in the exposure meter and which has inputs in the form of two axially movable rods. The differential is designed such as to form a resulting correction value for two exposure factors when the prerequisite condition for automatic exposure measurement is met in the form of adjustable stop members, and is automatically disengaged so that manual measurement can be carried out by other means not forming a portion of this invention, when said prerequisite condition for automatic measurement is not met. The mechanism includes means for automatically providing a signal, which is visible through a window in the outside of the camera, to indicate whether automatic or manual exposure measurement is to be effected.

In exposure meters of the trough-the-lens type, it is known to compare at measurement the resistance of the light-sensitive device of the meter, for example a photoresistor, with the resistance of a variable resistor, for example a rheostat having a carbon path. Exposure meters of this general type are well known; e.g., see Schmidt U.S. Pat. No. 3,468,233 issued Sept. 23, 1969, for "Exposure Measuring Device for Single Lens Reflex Cameras," and see also Tenne U.S. application Ser. No. 154768 filed June 21, 1971 for "Light Measuring Apparatus for a Single-Lens Reflex Camera." The value of the variable resistor at the time of measuring depends on correction values corresponding to the exposure factors, namely preset aperture size, applied film speed and set shutter speed. The resulting resistance value corresponding to the three exposure factors thereby is set, with the resistor path and a sliding contact running thereagainst being moved individually and independently of each other, in such a way that the correction value for one exposure factor controls one of the movements, and the correction values for the two remaining factors are summed up in a mechanical differential which controls the second of said movements. In this connection it is known, for example, to let the carbon path of the rheostat move in such a way, that the movement of the carbon path is coupled by cogwheels to the speed ring; and stop members are provided, taking the form of a guide curve on the diaphragm ring of the lens and, respectively, an adjustable stop member within the film magazine for the film speed, which stop members are sensed by axially movable rods constituting inputs to a differential for setting the sliding contact of the rheostat. Differentials for this purpose, for example cable differentials, articulated differentials and rack/cogwheel differentials, are known in several different embodiments adapted to the camera construction in question.

The differential type described above is applied in connection with automatic exposure meters. This presupposes that there are inputs for the differential in the form of movable stop members the positions of which can be appropriately sensed to provided correction values for two exposure factors. This is not always the case in so-called system cameras associated with several interchangeable lenses, intermediate rings, additional bellows, film magazines etc. When, for example, the lenses are provided with a guide curve for one of the differential inputs, and such a lens is attached to the camera in combination with an intermediate ring or additional bellows, the guide curve is displaced in the direction away from the sensing input of the differential and thereby renders automatic exposure measurement impossible. A further example, in which automatic exposure measurement is impossible, is when a manufacturer introduces a new model of a known system camera which, for the first time, includes provision for automatic exposure measurement. Interchangeable lenses, film magazines and other accessories of a system camera represent a very large part of the total costs of the complete camera equipment. Therefore, the new model usually is constructed so as to allow for utilization of the accessories for the old model on the new model as well. An older camera equipment, thus, can be modernized at relatively moderate costs. This is of a great advantage for the purchaser, even when considering that the older accessories to some extent may restrict the capabilities of the new model, as in the exemplified case in which automatic exposure measurement becomes impossible when the older accessories are mounted on a camera body of the new model.

Exposure meters of the aforedescribed kind for automatic measurement can also be used for manual measurement, which is necessary when the prerequisites for automatic measurement are not provided. Manual measurement necessarily is somewhat more complicated, but yet relatively simple for the majority of camera types, which have only interchangeable lenses but no exchangeable film magazines. The difficulties increase considerably when the camera is equipped with interchangeable lenses as well as with exchangeable film magazines, because then both inputs of the differential are concerned. The present invention has as its object, in cameras having both interchangeable lenses with preset diaphragm and exchangeable film magazines, to render possible a rapid, simple and safe handling of the camera at exposure measurement, irrespective of whether automatic or manual measurement is to be effected.

SUMMARY OF THE INVENTION

The aforementioned advantages are achieved, according to the invention, by means of a mechanical differential, which at automatic exposure measurement sets in a manner known per se the variable resistor of the exposure meter through the agency of axially movable rods which sense the positions of associated stop members, the mechanism being arranged to automatically disengage the differential if one or both of the stop members is not present for sensing. If the differential is disengaged, i.e., because manual exposure measurement is required, the rheostat is set by means of a known control box, which includes means for actuating the exposure meter in both measurement methods, and which also includes means for setting the angle of rotation of the rheostat in correspondence with the exposure factors set on the scales of the control box. In the differential there is further included an automatically operating optical signal device which, in a window provided in the outside of the camera, shows symbols for automatic and, respectively, manual exposure measurement, for example "A" and, respectively, "M." The photographer in this way can determine at one glance whether the combination of lens and film magazine mounted on the camera allows for automatic exposure measurement, or whether manual measurement is to be applied. Thereafter the scales on the control box, according to the symbol shown, can be set either automatically or manually in accordance with the exposure factors in question. In both cases the exposure meter is actuated in the same way by depressing an operation key on the control box.

The differential itself can be designed in several different ways to fit the individual camera construction. These different designs, according to the basic idea of the invention, have in common that they comprise inputs in the form of axially movable rods, and further that they include an automatic releasing device and an automatic signal device. The different designs are further characterized by the fact that the resulting correction value is taken out as a rotary motion determined by said value, which motion at automatic exposure measurement is coupled to the variable resistor of the meter designed as a rheostat.

The principal of releasing the differential, and of controlling the signal device, is as follows. The inputs of the differential are designed as axially movable rods mounted in the differential with a small axial play, about 1.5 – 2 mm, and they are so actuated by springs that the rods project outwardly of the camera box by the distance allowed for by said play, i.e. 1.5 – 2 mm, when the exposure meter is not actuated. The movable rods in turn each actuate one end of a pivotal release arm, which resiliently presses against the rods or their mounting means. The signal device in the most simple case is arranged such that the symbols, for example "A" and, respectively, "M," are fastened on a suitable portion of the release arm, in front of which is located the window in the outer camera casing. In other cases the symbols are placed on a separate rotatable arm, which is controlled by a link mechanism connected to the release arm. In the position described above, when the rods project 1.5 – 2 mm outwardly of the camera box, the release arm assumes a position such that the differential is engaged, and the signal device shows the symbol "A" for automatic measurement. This position is not affected when an interchangeable lens and, respectively, a film magazine intended for automatic exposure measurement, are attached on the camera box, since holes are provided for the axially movable rods in the lens and, respectively, film magazine, so that the rods can extend inwards to the stop member in question to be sensed when the meter is actuated. When attaching a lens and a film magazine, of which one or both are of an older model not intended for automatic measurement, these components do not have the aforesaid holes for the rods and, consequently, one or both of the rods are pressed in the same distance as they project outwards. When this occurs the release arm is forced to rotate through a corresponding distance, due to its actuation by one or both rods. The release arm thereupon releases the locking member, by which the differential was maintained engaged, and at the same time the release arm actuates the signal device to switch from "A" to "M," thereby indicating the necessity of manual exposure measurement. The rheostat is not actuated by the differential, as this is not moved out of its position, because the rods were moved only a short distance corresponding to the axial play in their mounting means in the differential.

BRIEF DESCRIPTION OF THE DRAWINGS

The invention is described in greater detail in the following by way of two embodiments, with reference to the accompanying drawings showing a cable differential and an articulated differential.

FIG. 1 is an exploded perspective view showing in a schematic way a camera with the cable differential according to the invention, the camera box being removed, FIG. 2 is a perspective view showing a detail of the outside of the camera with an optical signal device for the cable differential according to FIG. 1.

DESCRIPTION OF THE PREFERRED EMBODIMENTS

Figure 3:
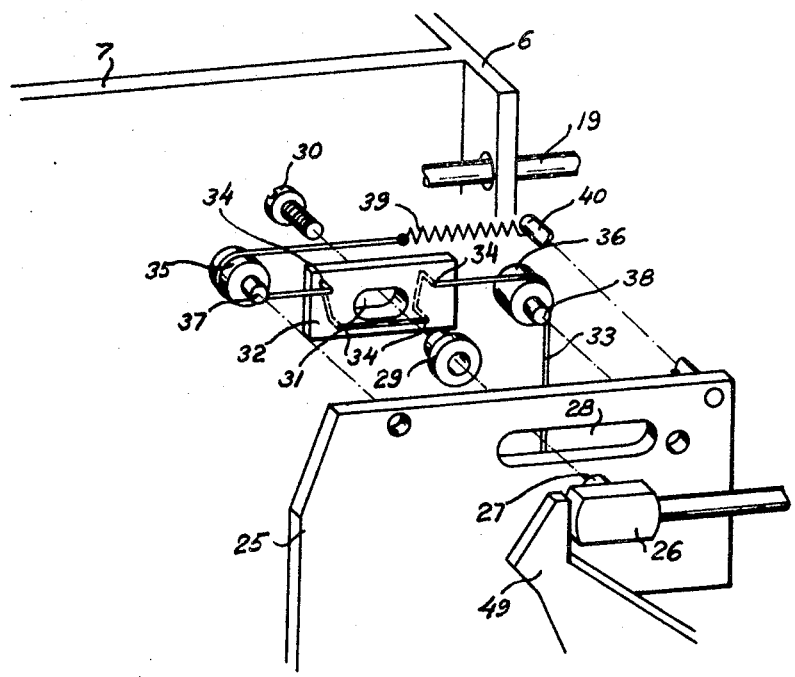
FIG. 3 is an exploded perspective view showing a detail of the upper cable mounting of the differential with adjacent details, FIG. 4 corresponds to FIG. 1, but shows the articulated differential according to the invention, and FIG. 5 corresponds to FIG. 2, showing the signal device of the articulated differential according to FIG. 4.

In the following description, the same reference numerals are used for the two identical camera boxes and accessories shown in the Figures, while the details of the two embodiments of the differentials are given separate reference numerals.

On the front wall 2 of a camera box 1, FIGS. 1 and 4, a shutter speed setting ring, the time scale 4, is rigidly mounted concentrically with an interchangeable lens 3. An exchangeable film magazine 5 is attached to the rear wall 6 of the camera box 1. The greater part of an exposure meter associated with the camera is mounted on the left-hand side wall 7 of the camera box 1. In FIGS. 1 and 4 are shown, for reasons of greater clarity, only one cable differential and, respectively, one articulated differential according to the invention, together with coacting details. The variable resistor in the exposure meter which is so to be set as to provide a resistance value corresponding to the values set for the exposure factors, which resistance value at measurement is compared electronically with the resistance of a photoresistor included in the exposure meter, has the form of an arc-shaped carbon path 9, which is mounted on a setting wheel 8 and sensed by a sliding contact 10. For setting the resistance value corresponding to the exposure factors, between one end point of the carbon path 9 and the sliding contact 10, both the carbon path 9 and the sliding contact 10 are arranged to be rotatable independently of each other, in such a manner, that the rotation of the carbon path 9 is controlled by a differential according to the invention which at automatic exposure measurement senses and sums up the two remaining exposure factors, i.e. preset aperture value and set film speed.

The rotation of the carbon path 9, which is not involved in the present invention, is so effected in a known manner that a toothed sector 11 of crown-wheel type provided on the time scale 4 turns the setting wheel 8 and its carbon path 9 via an intermediate wheel 12 mounted in the wall 2. The angular movement of the setting wheel 8 is, as a result, proportional to the graduation on the exposure scale 13 of the time scale 4, and the necessary correction for the set shutter speed is thus supplied to the exposure meter (FIGS. 1 and 4).

The correction for the preset aperture size is supplied to the exposure meter in a previously known manner, in such a way, that a guide curve 15 provided on the aperture preset ring 14 of the lens 3 is sensed, at the time of measurement, by an axially movable lower pressure rod 16, FIG. 1, and, respectively, 17, FIG. 4, mounted in the wall 2 and constituting one of the two inputs of the differential. The axial movement of the pressure rod 16 and, respectively, 17 depends on the angular position assumed by the aperture preset ring 14 at the measuring occasion, i.e. it depends on the aperture size set on the aperture scale 18, whereby the necessary correction for the aperture size is transferred to the exposure meter.

The correction for applied film speed is supplied to the exposure meter via the second input of the differential which is designed as an axially movable upper pressure rod 19, FIG. 1, and, respectively, 20, FIG. 4, mounted in the wall 6. At measurement, the pressure rods 19 and, respectively, 20 sense in a known manner an adjustable stop member 21 in the film magazine 5 which is set on a correction value corresponding to the film speed by a cam curve (not shown), which is rotated by a key 22 on the film magazine 5 until the desired film speed value according to DIN or ASA becomes visible in the associated scale window 23 and, respectively, 24.

The cable differential, FIGS. 1-3, is built up on a mounting plate 25, which is detachably mounted on the side wall 7 by spacer members (not shown). The upper pressure rod 19 is mounted on the side of the mounting plate 25 remote from the camera box 1. The pressure rod 19 is provided with a head 26, on which is provided a guide pin 27 (FIG. 3) running in a longitudinal groove 28 in the mounting plate 25. On the inner surface of the mounting plate 25 a sleeve 29 is fastened by a screw 30 (FIG. 3) against the free end of the guide pin 27. Said sleeve 29 extends through a hole 31 in an upper carrier member 32, through which the cable 33 of the differential is threaded. The sleeve 29 runs freely in the hole 31, which is somewhat oblong in the direction of motion of the carrier member 32, and thereby renders it impossible for the upper pressure rod 19 to move a short distance without actuation of the cable 33 by the carrier member 32. The position of the carrier member 32 in relation to the pressure rod 19 (FIG. 3) is easily adjusted to the desired position by temporarily slackening the cable 33, which is threaded through four cable holes 34 in the carrier member 32, so that the desired displacement can be made. The cable 33 runs over two upper guide wheels 35, 36 mounted on journals 37 and, respectively, 38 secured in the mounting plate 25. The upper end of the cable 33 is fastened to a tension spring 39, which at its opposite end is fastened on a pin 40 in the mounting plate 25. By action of said tension spring 39 the carrier member 32 is pulled to the left, FIGS. 1 and 3, until the guide pin 27 arrives at the left-hand end position in the groove 28. The lower pressure rod 16 is mounted in a similar way on the surface of the mounting plate 25 facing the camera box 1, FIG. 1, by means of a head 41, a longitudinal groove 42 in the mounting plate 25 for the guide pin (concealed) of the head 41, a sleeve (concealed) for a lower carrier member 43, a uniting screw 44, lower guide wheels 45, 46 and a tension spring 47 fastened on a pin 48. When the heads 26, 41 have been pulled so that their associated guide pins are located at their left-hand and, respectively, right-hand end positions in the grooves 28 and, respectively, 42 (FIGS. 1 and 3), the exposure meter is not actuated. In this position the heads 26, 41 are touched by a release arm 49 (FIGS. 1 and 3), which is pivotally mounted on an axle journal 50 in the mounting plate 25. Said release arm 49 tends to rotate clockwise by action of a release spring 51 fastened on a pin 52. The pressure rods 16, 19 hereby are pressed forward a distance corresponding to the play in the hole (concealed) of the carrier member 43 and, respectively, in the hole 31 of the carrier member 32 (FIGS. 1 and 3) whereby the free ends of the pressure rods 16, 19 resiliently project about 1.5 – 2 mm outwardly of the camera box 1.

A balancing arm 53 (FIG. 1) is supported at one end on an axle 54 and tends to rotate counterclockwise by action of a torsion spring 55 extending about the axle 54 and pressing against the pin 52 and, respectively, a pin 56 on the balancing arm 53. At the free end of the balancing arm 53 an axle (concealed) is fastened, on which a rear and a front cable pulley 57 and, respectively, 58 are mounted. The axle journal of the axle (concealed) is formed as a stop stud 59 for a lateral arm 60 provided on the release arm 49, which lateral arm at automatic exposure measurement blocks the movement of the balancing arm 53.

For actuating the exposure meter, the cable differential is provided with a cable adjusting device, which comprises a center hub 61 fastened on the mounting plate 25 (FIG. 1), in which hub a cable adjusting axle 62 is supported. On the end of the cable adjusting axle 62 facing the camera box 1, a cable adjusting member 63 is rigidly mounted, on the free end of which is provided a cable adjusting journal 64. The outer free portion of said journal 64 includes a flattened portion in parallel with the longitudinal axis of the journal 64. Said flattened portion supports a cable adjusting wheel 65 mounted on an axle 66, which is secured perpendicularly to said flattened portion. On the outside of the center hub 61 a rear center wheel and a front center wheel 67 and, respectively, 68 and the setting wheel 8 are mounted. Through the free end of the cable adjusting axle 62 a carrier member 69 is provided. Said cable adjusting axle 62 and said carrier member 69 are fitted in a corresponding hole 70 provided in the hub of the sliding contact 10, which hub is designed as a coupling half, whereby the angle of rotation is the same for the sliding contact 10 and the cable adjusting member 63 when the exposure meter is actuated by means of a control box, the connecting member of which to the differential of the camera is a coupling half 71 engaging two holes 72 in the hub of the sliding contact 10 (FIGS. 1 and 4).

The cable 33 (FIGS. 1 and 3) is stretched from its upper mounting point at tension spring 39 over the two guide pulleys 35, 36 to the rear cable wheel 57 on the balancing arm 53 and therefrom to the rear center wheel 67 and over the cable adjusting wheel 65, the front center cable wheel 68 to the front cable wheel 58 on the balancing arm 53, further to the lower guide pulleys 45, 46 and to its lower mounting point at the tension spring 47.

A signal device, which shows whether the exposure meter can operate automatically or the measurement is to be performed manually, is connected to the release arm 49 (FIGS. 1 and 2). The device comprises an angular lever 73, which is pivotally mounted on a journal 74 mounted in the mounting plate 25. One leg of the lever 73 is provided with a longitudinal hole 75, in which a control pin 76 runs which is fastened on the release arm 49, and the other leg of said lever is formed as a T with the symbols "A" for automatic and "M" for manual measurement. The symbols "A" and "M" can be read through a window 77 in the left-hand side of the camera (FIG. 2). Which of the symbols, "A" or "M," appears in said window 77, depends on the angular position assumed by the release arm 49 at the time of measurement. When both the interchangeable lens 3 and the film magazine 5 are intended for automatic exposure measurement, i.e. when both of them have adjustable stop members for the pressure rods 16, 19, then corresponding holes are provided for the rods 16 and, respectively, 19 (FIG. 1) in the lens 3 and magazine 5. Said pressure rods 16, 19 which as mentioned above project 1.5 – 2 mm outwardly of the walls 2 and, respectively, 6 of the camera box 1, thus extend freely, and the mechanism assumes the position shown in FIG. 1, the lateral arm 60 abutting the stop stud 59, i.e. the balancing arm 53 is locked and, thereby, the cable differential is engaged. In this position the symbol "A" is shown in the window 77 (FIG. 2). Upon actuation of the exposure meter by depressing the operation key of the known control box when its setting means is in position for automatic operation, the coupling half 71 of the control box turns counterclockwise whereby the cable adjusting member 63 turns in the direction of the arrow (FIG. 1) and stretches the cable 33, which pulls the carrier members 43, 32 in the direction toward the walls 2 and, respectively, 6 whereby the pressure rods 16, 19 are pushed out until they are stopped by the guide curve 15 and, respectively, by the stop member 21. Owing to the stopping of the pressure rods 16, 19, the cable differential cannot rotate further. The sliding contact 10, which as mentioned above has the same angle of rotation as the cable adjusting member 63 and coupling half 71, thus is brought to stop in a position on the carbon path 9 which corresponds to the total of the correction values sensed by the pressure rods 16, 19, which renders possible the automatic exposure measurement. In most cases the sliding contact 10 stops before the key of the control box has reached its bottom position. A spring means in the control box then allows for the key to continue to the bottom position.

When no adjustable stop member is provided to be sensed by one or both of said pressure rods 16, 19, the lens and/or film magazine do not include corresponding holes for the pressure rods 16, 19. When such a lens and/or magazine, or possibly another accessory, for example an intermediate ring, is attached on the camera, therefore, the corresponding pressure rod or rods are pressed inwards the same distance, 1.5 – 2 mm, by which they project outwardly beyond the walls 2 and, respectively, 6 of the camera box 1. One of the heads 26, 41, or alternatively both of them, then turn the release arm 49 counterclockwise through a short distance corresponding to the play between the hole 31 in the carrier member 32 and the sleeve 29 (FIG. 3) and, respectively, the play of the corresponding details for the lower pressure rod 16 (FIG. 1). Due to said turning of the release arm 49, the lever 73 changes its position so that the symbol "M" becomes visible in the window 77, and at the same time the lateral arm 60 leaves its locking position against the stop stud 59 thereby disengaging the cable differential. Since no stop members to be sensed are provided in one or both inputs of the differential, manual exposure measurement is required, which is indicated by appearance of the symbol "M" in the window 77. The setting of the sliding contact 10 on the carbon path 9 is taken over by the known control box, on the setting means of which the known exposure factors are set. Upon depressing the operation key of the control box, the coupling half 71, sliding contact 10 and cable adjusting member 63 rotate in the same manner as at automatic measurement described above, but an adjustable stop member provided in the control box limits the rotation to an angle corresponding to the exposure factors set on the setting means of the control box, i.e. the control box, at the time of manual measurement, simulates the stop members which are sensed by the inputs of the differential during automatic measurement. At the measurement, the cable adjusting member 63 also moves in the direction of the arrow and stretches the cable 33. Since, upon the stretching of the cable, neither one nor both of the pressure rods 16, 19 can be pushed out against associated stop members, the balancing arm 53, which now is free, rotates clockwise and tightens the torsion spring 55, whereby the cable adjusting member 63 is enabled to complete its movement without being stopped by one or both of the immovable pressure rods 16, 19.

The articulated differential (FIGS. 4–5) is built up directly on the left-hand side wall 7 of the camera box 1. The lower pressure rod 17, which constitutes the input of the differential for the correction value for the preset aperture size, is mounted in the wall 2 and movably secured at the lower end of a link 78. Said rod is of angular shape to be able to control a release catch 79. The upper pressure rod 20, which constitutes the input of the differential for the correction value for the applied film speed, is mounted in the wall 6 and provided with a fixed rack 80, which meshes with a reversal cogwheel 81 mounted on an axle journal 82 fastened in a release arm 83. The relase arm 83 and a toothed sector 85, which meshes with the cog-wheel 81, are pivotally mounted on a fixed axle 84 in the side wall 7. The release catch 79 is pivotally mounted on a journal 86 and tends to rotate clockwise by action of a tension spring 87, which is fastened in a hole 88 and on a fixed pin 89. Said catch 79, by abutting the rack 80 and the angular portion of the lower pressure rod 17, accordingly causes the pressure rods 17 and 20 to resiliently project about 1.5 – 2 mm outwardly of the camera box 1. A lateral arm 90 on the release catch 79 locks the release arm 83, so that the differential is engaged when the pressure rods 17, 20 project outwardly of the camera box 1, whereby the clockwise movement of the release arm 83 is limited by a stop pin 91. A fixed pin 92 is provided on the release arm 83 and runs in a longitudinal groove 93 in the toothed sector 85. The link 78, which is pivotally mounted on a journal 94 on the toothed sector 85, is connected to an angular rack 95 by means of a journal 96 and a longitudinal hole 97, which allows for a play of about 1.5 mm in the direction of motion of the rack 95. Said rack 95 meshes with a cogwheel 98 mounted on an axle 99, which is supported in the side wall 7 and at the free end of which is provided a carrier member 100 for the hole 70 in the sliding contact 10. A tension spring 101 fastened between the rack 95 and a fixed pin 102 tends to move the rack 95 so to the right that the journal 96 assumes its left-hand end position in the hole 97. The setting wheel 8 is also mounted on said axle 99. A simple signal device in the form of the symbols "A" and "M" mentioned in connection with the cable differential and placed on an L-shaped portion of the release catch 79, can be read through a window 103 (FIG. 5) in the outside of the camera.

The operation of the articulated differential is, according to the basic idea of the invention, analogous with that of the cable differential. When the lens 3 and film magazine 5 are intended for automatic exposure measurement, and the meter is not actuated, the articulated differential assumes the position shown in FIG. 5, at which time the release catch 79 by action of the spring 87 has pushed out the pressure rod 17, 20 such a distance as allowed for by the play between the journal 96 and the hole 97, i.e. about 1.5 - 2 mm. At the same time, the lateral arm 90 on the release catch 90 locks the release arm 83. The pin 92 is by action of the spring 101 in the right-hand outer portion of the groove 93. The articulated differential is engaged, and the symbol "A" is visible in the window 103. When at the measurement the coupling half 71 in the aforesaid control box rotates clockwise, then also the sliding contact 10 and cogwheel 98 rotate. Hereby the rack 95 moves to the left and pulls along the link 78, which moves the pressure rod 17 out against the guide curve 15 and via the toothed sector 85, cogwheel 81 and rack 80 moves the pressure rod 20 out against the stop member 21. The pressure rods 17, 20 being stopped, the differential cannot be rotated further and, therefore, the position of the sliding contact 10 on the carbon path 9 is corresponded by the total of the sensed correction values, which are represented by the positions of the guide curve 15 and stop member 21. Due to the spring means in the control box, the operation key of the box can be depressed to bottom position in the way described above.

At manual exposure measurement, when one or both of the two pressure rods 17, 20 in the aforedescribed manner are pressed in 1.5 - 2 mm to flush with the walls 2 and, respectively, 6 of the camera box 1, the rods turn the release catch 79 counterclockwise to an extent sufficient to disengage the catch between the lateral arm 90 and the release arm 83. At the same time the symbol in the window 103 (FIG. 5) is moved from "A" to "M," thereby indicating the necessity of manual measurement. The pressing of one or both of the two pressure rods 17, 20 against the camera box 1 does not affect the position of the rack 95, because the corresponding displacement of the link 78 is compensated for by the play between the journal 96 and hole 97. When the setting means of the control box have been set for the exposure factors in question, and the operation key of the box has been depressed, the coupling half 71, sliding contact 10 and cogwheel 98 rotate, the latter pulling the rack 95 to the left. As a result, the link 78 is also pulled to the left, its lower end being retained by the pressure rod 17, which as described above is locked in its pressed-in position. Therefore, the 78 turns about its lower mounting point in the pressure rod 17 and thereby forces the journal 94 and toothed sector 85 to the left, whereby also the release arm 83, which is not locked, follows along to the left, and the cogwheel 81 rolls along the rack 80, which is locked by the pressure rod 20 pressed in. The angle of rotation for the sliding contact 10, thus, is not affected by the articulated differential at manual exposure measurement. The operation of the articulated differential at manual measurement is simulated, as in the case of the aforedescribed cable differential, by the control box, the stop member of which controlled by the setting means to determine the angle of rotation of the sliding contact 10.

The invention is not restricted to the two embodiments shown, but may be varied substantially within the scope of its basic idea. The differential, for example, alternatively may control the setting wheel 8, and the third exposure factor instead controls the sliding contact 10. It is possible as well to select any desired pair of the three exposure factors i.e., aperture size, shutter speed and film speed, to be sensed by the inputs of the differential, as the choice is affected only by what is suitable in the individual case from a construction point of view.

We claim:

1. In a camera adapted to be provided with lenses having preset diaphragms and also to be provided with exchangeable film magazines, and wherein said camera includes an exposure meter of the trough-the-lens type having a mechanical differential provided with two inputs taking the form of axially movable rods adapted to sense the positions of adjustable stop members forming portions of said lenses and magazines respectively, to jointly adjust a variable resistor in accordance with two preselected exposure factors, and wherein the correction value of a third exposure factor is adapted to be supplied to said exposure meter independently of said differential, the improvement wherein said differential includes a release device for selectively engaging and disengaging said differential, said release device including means responsive to the presence of said two adjustable stop members for setting said differential into its engaged condition to permit automatic setting of said exposure meter in accordance with the positions of said adjustable stop members, and means responsive to the absence of at least one of said adjustable stop members for disengaging said differential to permit said correction values to be manually set into said exposure meter.

2. The structure of claim 1 wherein said axially movable rods project outwardly of the camera box when the exposure meter is not actuated, means for resiliently urging each of said rods to its outwardly projecting position, and coupling means for coupling each rod to said differential with an axial play which corresponds substantially to the extent by which said rods project outwardly of said camera box, whereby said rods can be pressed inwardly toward said camera box to the extent of their axial plays without causing the differential to vary said variable resistor, said release device including means operative to disengage said differential when at least one of said rods is pressed inwardly toward said camera box to the extent of its axial play.

3. The structure of claim 1 including indicator means responsive to the condition of said release device for indicating whether said differential is in condition for automatic or manual exposure measurement.

4. The structure of claim 2 wherein said differential is of the cable type.

5. The structure of claim 4 wherein said coupling means, between each of said rods and said differential, comprises a structural member at said differential having an elongated hole therein, and a sleeve connected to said rod and passing through said elongated hole for axial movement relative to said hole to provide said axial play between said rod and said differential.

6. The structure of claim 4 including an elongated release arm mounted for pivotal movement adjacent a central position thereof, the free ends of said arm on opposite sides of its pivot being disposed adjacent the innermost ends of said axially movable rods to control the positions of said rods, said release arm being provided with a laterally extending locking arm for controlling the release device of said differential.

7. The structure of claim 6 including a pivotally mounted spring-loaded balancing arm for the cable of said differential, said balancing arm being located adjacent and coacting with said laterally extending locking arm to lock said balancing arm in position at the time of automatic exposure measurement, and to release said balancing arm for movement with the cable of said differential at the time of manual exposure measurement.

8. The structure of claim 7 including a cable adjusting device for stretching the cable of said differential at the time of exposure measurement.

9. The structure of claim 8 including a cable adjusting device disposed adjacent each of said rods, a pair of carrier members disposed adjacent said adjusting devices, said carrier members being provided with holes through which the cable of said differential passes, said holes being arranged to lock said carrier members in position relative to said cable is taut, and to release said carrier members relative to one another when said cable is slackened temporarily at the time of adjustment.

10. The structure of claim 1 wherein said differential is of the articulated type.

11. The structure of claim 10 including means for mounting said rods with axial play relative to said differential.

12. The structure of claim 10 including a spring-loaded release catch pivotally supported on a journal located between the ends of said catch, means coupling said rods to portions of said catch on opposite sides of said journal, a release arm having a recess therein, and a lateral arm extending from said release catch into locking engagement with said recess when both of said rods project outwardly of the camera box, said lateral arm being disengaged from said recess when at least one of said rods is pressed inwardly toward the camera box to permit manual exposure measurement.

13. The structure of claim 12 including a rack fastened to one of said rods for operating the release device of said differential, said release arm being pivotally mounted on a journal and having a cog wheel thereon which meshes with said rack.

14. The structure of claim 13 including a toothed sector attached to said release arm and in mesh engagement with said cog wheel, a link connected between said toothed sector and the other one of said rods, a further rack fastened to said link and operative to assume a position related to the sum of the correction values transferred by both of said rods, and means responsive to the position of said further rack for adjusting the variable resistor of said exposure meter.

15. The structure of claim 14 wherein said last-named means comprises a further cog wheel in mesh engagement with said further rack, said further cog wheel being mounted on an axle, a rotatable resistance element supported on said axle, and an electrical contact driven by said axle and in slidable engagement with said resistance element.

16. The structure of claim 12 including a signalling device connected to said release catch for indicating whether said differential is in condition for automatic or manual exposure measurement, said signalling device comprising a movable member bearing symbols which are visible selectively through a window in a wall of said camera.

17. The structure of claim 3 wherein said indicator means comprises a pivotally mounted member bearing symbols thereon which are selectively visible through a window in an exterior wall of said camera.

* * * * *